United States Patent Office 3,449,278
Patented June 10, 1969

3,449,278
EPOXIDE RESIN COMPOSITIONS
Alan Gordon McKay, Sawston, and Peter Thomas Brown, Melbourn, near Royston, England, assignors to Ciba Limited, Basel, Switzerland, a company of Switzerland
No Drawing. Filed Apr. 4, 1967, Ser. No. 628,267
Claims priority, application Great Britain, Apr. 15, 1966, 16,690/66
Int. Cl. C08g 45/12
U.S. Cl. 260—23    19 Claims

ABSTRACT OF THE DISCLOSURE

A hardenable aqueous dispersion comprising
(a) An 1,2-epoxide resin containing more than one terminal 1,2-epoxide group per average molecule,
(b) As hardener therefor, an adduct, liquid at room temperature and containing hydrogen directly bonded to nitrogen, of (i) a member selected from the group consisting of aliphatic compounds containing only one terminal 1,2-epoxide group per molecule, araliphatic compounds containing only one terminal 1,2-epoxide group per molecule, aromatic compounds containing only one terminal 1,2-epoxide group per molecule and aliphatic compounds containing at least two terminal 1,2-epoxide groups per average molecule, with (ii) a stoichiometric excess of a poly(aminoamide) condensation product of (I) an alkylenepolyamine and (II) a polymeric araliphatic acid obtained by the copolymerisation of a member selected from the group consisting of a conjugated unsaturated fatty acid and an amide-forming derivative of a conjugated unsaturated fatty acid, with an aromatic vinyl compound.

---

This invention relates to hardenable epoxide resin compositions, and, in particular, to aqueous dispersions containing such compositions and to hardened products obtainable therefrom.

It is known that poly(aminoamides), containing free amino groups and prepared from alkylenepolyamines and polymerised unsaturated natural fatty acids, can be used to harden epoxide resins. It is also known to harden epoxide resins with adducts formed from these polyamides and polyepoxides. While it has been proposed to form hardenable aqueous dispersions of such adducts and epoxide resins, the results obtained are frequently unsatisfactory. Thus, in some cases, the adducts, especially those prepared from aromatic polyepoxides, are semi-solid and are not readily dispersible in aqueous media, while aqueous dispersions which contain an aromatic epoxide resin and an adduct prepared from an aliphatic polyepoxide often undesirably exhibit thixotropic behaviour.

It has now been found that, by use of certain adducts prepared from mono- or polyepoxides with poly(aminoamides) derived from araliphatic acids and alkylenepolyamines, there may be obtained aqueous dispersions in which the aforesaid disadvantages are mitigated or substantially overcome.

One feature of the present invention accordingly provides hardenable aqueous dispersions containing
(a) an epoxide resin containing more than one terminal 1,2-epoxide group per average molecule,
(b) as hardener therefor, an adduct, liquid at room temperature and containing hydrogen directly bonded to nitrogen, of (i) a non-aliphatic compound containing only one terminal 1,2-epoxide group per molecule, or an aliphatic compound containing one or more terminal 1,2-epoxide groups per average molecule, with (ii) a stoichiometric excess of a poly(aminoamide) condensation product of (I) an alkylene-polyamine and (II) a polymeric araliphatic acid obtained by the copolymerisation of a conjugated unsaturated fatty acid, or an amide-forming derivative thereof, with an aromatic vinyl compound. By an "amide-forming derivative" of a conjugated unsaturated fatty acid is meant a derivative in which the carboxyl group is replaced by a group which reacts with a primary or secondary amine to produce an amide group.

As the epoxide resin component (a) containing more than one terminal 1,2-epoxide group, i.e.

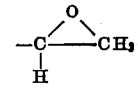

per average molecule, there may be used, for example, polyglycidyl esters obtainable by the reaction of a di- or poly-carboxylic acid with epichlorohydrin or glycerol dichlorohydrin in the presence of an alkali. Such polyglycidyl esters may be derived from aliphatic dicarboxylic acids, e.g. oxalic acid, succinic acid, sebacic acid, or dimerised or trimerised linoleic acid, and from aromatic dicarboxylic acids such as phthalic acid, isophthalic acid, terephthalic acid, naphthalene-2,6-dicarboxylic acid, diphenyl-2,2'-dicarboxylic acid and ethylene glycol bis(4-carboxyphenyl ether). Specific such polyglycidyl esters are, for example, diglycidyl phthalate, diglycidyl adipate and those diglycidyl esters which correspond to the average formula:

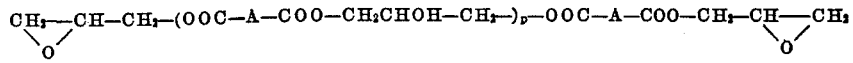

in which A represents a divalent aromatic hydrocarbon radical, such as a phenylene group, and $p$ represents a small whole or fractional positive number.

Other epoxide resins which may be used as component (a) include polyglycidyl ethers, such as those obtainable by the interaction of a dihydric or polyhydric alcohol or a dihydric or polyhydric phenol with epichlorohydrin or a related substance (for example, glycerol dichlorohydrin) under alkaline conditions or, alternatively, in the presence of an acidic catalyst with subsequent treatment with alkali. These compounds may be derived from diols or polyols, such as ethylene glycol and polyethylene glycols, propylene glycol and polypropylene glycols, propane-1,3-diol, butane-1,4-diol, pentane-1,5-diol, hexane-1,6-diol, hexane-2,4,6-triol, glycerol or N-aryldialkanolamines such as N-phenyldiethanolamine or, preferably from dihydric or polyhydric phenols such as resorcinol, catechol, hydroquinone, 1,4-dihydroxynaphthalene, 1,5-dihydroxynaphthalene, bis(4 - hydroxyphenyl)methane, bis(4 - hydroxyphenyl)methylphenylmethane, bis(4 - hydroxyphenyl)tolylmethanes, 4,4' - dihydroxydiphenyl, bis (4-hydroxyphenyl)sulphone and, especially, 2,2-bis(4-hydroxyphenyl)propane (Bisphenol A) or phenol-formaldehyde condensation products.

There may further be employed as component (a) aminopoly-epoxides such as are, for example, obtained by the dehydrohalogenation of the reaction products of epihalohydrin and primary or di-secondary amines such as aniline, a-butylamine, bis(4-aminophenyl)methane or bis(4-methylaminophenyl)methane.

Especially suitable epoxide resins for use as component (a) are those obtained by the reaction of 2,2-bis(4-hydroxyphenyl)propane with epichlorohydrin and having an epoxide content of about 2.0 to 5.88 epoxide equivalents per kilogram.

As the compound (i) having only one terminal 1,2-epoxide group, employed to form the adduct component (b), there may be used an aliphatic or non-aliphatic, e.g. araliphatic, monoepoxide, for example, a monoepoxyalkane containing 2 to 4 carbon atoms, such as ethylene oxide, propylene oxide, butylene oxide, or epichlorohydrin, or an alkyl or aryl glycidyl ether containing a total of 5 to 11 carbon atoms, such as n-butyl glycidyl ether or phenyl glycidyl ether. Preferably, propylene oxide, n-butyl glycidyl ether or phenyl glycidyl ether is used. Alternatively the compound (i) may be an aliphatic compound having more than one terminal 1,2-epoxide group per average molecule, for example, diglycidyl ethers of polyhydric alcohols, especially of dihydric alcohols containing from 2 to 6 carbon atoms, such as ethylene glycol diglycidyl ether, diethylene glycol diglycidyl ether, and propane-1,2- and propane 1,3-diol diglycidyl ethers. Preferably, butane-1,4-diol diglycidyl ether is used.

The poly(aminoamide) (ii) employed to form the adduct component (b) is preferably one derived from (I) an alkylenepolyamine and (II) a polymeric araliphatic acid obtained by copolymerisation of a conjugated fatty acid, or a lower alkyl ester thereof, with styrene in a molar ratio between 1:0.2 and 1:5 in the substantial absence of free radical-forming catalysts and in the presence of an inhibitor for free radical-catalysed polymerisation. Such poly(amino amides) are described in British patent specification No. 988,738. Particularly preferred are the said poly(aminoamides) which have an amine value of between 85 and 435.

To prepare the adduct component (b), reaction between the poly(aminoamide) (ii) and the epoxide (i) is suitably effected in the liquid phase, the epoxide being added to the poly(aminoamide), with the application of heat if desired. Preferably, the poly(aminoamide) is used in a quantity sufficient to supply from about 5 to 20 amino-hydrogen atoms for each 1,2-epoxide group in the epoxide component of the adduct.

The ratio of component (b) to component (a) may vary within considerable limits, and will depend on such factors as the active-hydrogen content of component (b) and the epoxy group content of component (a). Optimum proportions may readily be determined by routine experiment; generally, however, component (b) is used in a quantity sufficient to supply from 0.75 to 1.25 amino-hydrogen equivalents per 1,2-epoxide equivalent of component (a).

The aqueous dispersions preferably also contain an accelerator for the hardening action. Suitable accelerators are compounds containing at least one tertiary amino nitrogen atom and a phenolic hydroxyl group, 2,4,6-tris(dimethylaminomethyl)phenol or 2-dimethylaminomethyl-4-nonyl-phenol being particularly preferred. Other accelerators may, however, be used. When the accelerators contain groups, e.g. primary amino groups, capable of reacting with the epoxy group or groups of the epoxide compound (i) employed to form the adduct (b), they should be incorporated in the aqueous dispersion after the formation of the adduct (b) has been effected. The aqueous dispersions may further contain diluents or viscosity-reducing agents for the epoxide resin or the adduct, such as phenyl glycidyl ether, but especially a glycidyl ether of an aliphatic monohydric alcohol containing from 4 to 10 carbon atoms, such as n-butyl glycidyl ether and iso-octyl glycidyl ether, or a diglycidyl ether of an aliphatic dihydric alcohol having from 2 to 6 carbon atoms, such as butane-1,4-diol diglycidyl ether. Glycidyl ethers, employed as reactive diluents, should be incorporated in the aqueous dispersions of the present invention after the formation of the adduct has been effected. The dispersion may also contain pigments such as titanium dioxide, plasticising agents such as polypropylene glycols, extenders such as low viscosity coal-tar fractions, and flow-control agents. They may also contain, as an adhesion promoter, a silane containing reactive group, especially 3-(glycidoxy)propyltrimethoxysilane.

The aqueous dispersions of the present invention may readily be prepared by adding water, with stirring, to a mixture of components (a) and (b). To assist in effecting the dispersion, ortho phosphoric acid or a liquid monocarboxylic fatty acid, especially acetic acid, is preferably also present in the mixture.

The present invention also provides hardening products obtained by curing the aqueous dispersions of the present invention, and, in particular, concrete containing, or coated with, the aforesaid hardened products. The hardened products may also be used to form coatings on, e.g., sheet metal. Concrete, having incorporated therein the aforesaid hardened aqueous dispersions, exhibits reduced permeability to oil and to water, and greatly increased tensile, flexural and compressive strengths. The hardened aqueous dispersions may be incorporated in concrete by adding the hardenable aqueous dispersion to the aggregate-cement mixture, with additional water if necessary, and allowing the aggregate-cement mixture to set and the aqueous dispersion of the present invention contained therein to harden. Alternatively, the constituents of the aqueous dispersion, less the water, may be mixed with the aggregate and cement, and, at the time of use, enough water is added to give a slurry of the appropriate consistency, and the aqueous dispersion-cement-aggregate mixture is allowed to harden. Aggregate-cement mixes which contain the aqueous dispersions of the present invention adhere well on setting and curing to unset concrete, set, dry concrete, and even to set, wet concrete. Because of their excellent adhesion to concrete, stone and similar materials, the aqueous dispersoins of the present invention are also useful for fixing small stones and the like to concrete and similar substrates in the preparation of terrazzo and other decorative finishes.

The following examples illustrate the invention. Unless otherwise indicated, "parts" denotes parts by weight. Temperatures are given in degrees centigrade.

EXAMPLE I

The adducts used were prepared as follows.

Adduct A 408 parts of Poly(aminoamide I [a poly(aminoamide), prepared from an alkylene polyamine and a copolymer of conjugated fatty acid esters with an aromatic vinyl compound, having an amine value of 400–430, active hydrogen equivalent of approximately 90, and available from Messrs. J. Bibby and Sons Ltd., Liverpool, under the designation "Merginamide L 410"] were heated to 120°, and butane-1,4-diol diglycidyl ether (42 parts) was added thereto dropwise, while stirring. The mixture was cooled to 25°, and 2,4,6-tris(dimethylaminomethyl) phenol (50 parts), glacial acetic acid (15 parts), and 1 part of a flow-control agent available under the designation "Silicone DP 267" from Imperial Chemical Industries Ltd. were then added, with stirring, to produce Adduct A, which had a viscosity of 460 poises at 21°.

For purposes of comparison, other adducts were prepared as follows:

Adduct B

This was prepared as described for Aduuct A, except that, in place of Poly(aminoamide) I, there was used 543 parts of Poly(aminoamide) II [a poly(aminoamide) available under the designation "Versamid 140," prepared from polymerised unsaturated fatty acids, and having an amine number of 350–400]. Adduct B had a viscosity of about 4600 poises at 21°.

Adduct C

This was prepared as described for Adduct B, except that, in place of the butane-1,4-diol diglycidyl ether, there were used 63 parts of Epoxide resin I [ a resin containing 5–5.2 epoxide equivalents per kg., produced in a conventional manner by the reaction of 2,2-bis(4-hydroxyphenyl)propane with epichlorohydrin in the presence of alkali]. Adduct C was semi-solid at 21°.

To compare the dispersability in water of hardenable compositions comprising an epoxy resin having terminal 1,2-epoxide groups and either Adduct A or the corresponding amount (in terms of active hydrogen content) of Adduct B, the indicated quantity of the adduct was mixed with epoxide resin I and a reactive diluent (iso-octyl glycidyl ether, a mixture of $C_8$-alkyl glycidyl ethers available from Peter Spence and Sons Ltd., Widnes, Lancashire), and water added thereto with stirring. The following table shows the change in viscosity of the mixture on dilution. (The semi-solid Adduct C was not tested, as it could not readily be dispersed.)

|  | Parts | |
|---|---|---|
| Epoxide resin I | 87 | 87 |
| Adduct A | 57 |  |
| Adduct B |  | 72 |
| Iso-octyl glycidyl ether | 13 | 13 |
|  | Viscosity (poises) at 21° | |
| Water added: |  |  |
| Nil | 64 | 860 |
| 50 parts | 20* |  |
| 100 parts | 15* |  |
| 200 parts | 12* |  |

*Thixotropic.

EXAMPLE II

Titanium dioxide (rutile) (70 parts) was mixed with Epoxy resin I (87 parts) and iso-octyl glycidyl ether (13 parts) by milling. To this mixture were added 60 parts of Adduct A, followed by various amounts of water. The dispersions were spread into thin films, and allowed to dry at 21° or 5°. The touch-dry and hard-dry times (determined by the Beck-Koller method) were as follows:

|  | At 21° | | At 5° | |
|---|---|---|---|---|
| Water added | Touch-dry time | Hard-dry time | Touch-dry time | Hard-dry time |
| Parts: |  |  |  |  |
| 0 | 3-4 hours | 5-6 hours | 8-10 hours | 15-20 hours |
| 69 | 3-4 hours | 5-6 hours | 8-10 hours | 15-20 hours |
| 138 | 3-4 hours | 5-6 hours | 10-15 hours | 20-30 hours |
| 345 | 2-3 hours | 5-6 hours | 10-15 hours | 20-30 hours |

EXAMPLE III

To a mixture of aggregate and cement (3:1 by volume) (100 parts), were added Adduct A (2.8 parts), Epoxide resin I (4.2 parts) and iso-octyl glycidyl ether (0.5 part). Enough water was then added to give the mixture a spreading consistency, and the mixture was then allowed to set and cure at room temperature in the form of a slab 6.4 mm. thick. A similar specimen was prepared, using 100 parts of an aggregate-cement mixture (3:1 by volume), Adduct A (1.85 parts), a low-viscosity tar fraction (3.75 parts, available under the designation "Orgol Tar" from United Coke and Chemicals Co. Ltd., Sheffield), Epoxide resin I (1.6 parts), iso-octyl glycidyl ether (0.3 part), and water to the appropriate consistency.

Both the set and cured specimens were impermeable to oil and water when left in contact with these materials for 21 days. A similar slab of concrete, of the same thickness, prepared from aggregate and cement (3:1 by volume) and water only, was completely permeated by both oil and water within this time.

EXAMPLE IV

Aggregate-cement mixtures, containing aqueous dispersions of the present invention were prepared as described in Example III, and allowed to cure in the form of slabs in contact with unset concrete, set dry concrete, and set wet concrete substrates which had been prepared from aggregate, cement and water only. The mixtures, after setting and curing, adhered well to the substrates, whereas similar mixtures prepared without the aqueous dispersions did not adhere to the substrates.

EXAMPLE V

To mixtures of sharp sand and cement (3:1 by volume) (100 parts), were added the indicated amount of Adduct A, Epoxide resin I, iso-octyl glycidyl ether and "Orgol Tar," followed by water to the appropriate consistency. The tensile strengths of the products, after hardening at room temperature, were determined according to the American Foundry Association Tensile Strength Test, using a standard American Foundry Association ramming machine: the specimens were 2.54 cm. thick. Flexural strengths and compression strengths of the set and cured products were determined according to methods 304A and 303A respectively of British Standard Specification No. 2782. The strengths, each the average of three measurements, are expressed in kg./sq. cm.

| Parts | | | | Tensile strength | | | |
|---|---|---|---|---|---|---|---|
| Adduct A | Epoxide resin I | Iso-octyl glycidyl ether | "Orgal tar" | 3 blows | 20 blows | Flexural strength | Compressive strength |
| Nil | Nil | Nil | Nil | 9.4 | 11.0 |  | 63.3 |
| 0.93 | 1.4 | 0.207 | Nil | 19.8 | 24.6 | 86.5 | 167 |
| 1.86 | 2.8 | 0.414 | Nil | 76.8 | 72 | 193 | 270 |
| 2.8 | 4.2 | 0.621 | Nil | 88.5 | 1.03 | 256 | 426 |
| 0.46 | 0.7 | 0.1 | 1.25 | 23.5 | 28.3 | 27.3 | 66.8 |
| 0.91 | 1.4 | 0.21 | 2.50 | 39.3 | 46.3 | 94.7 | 296 |
| 1.36 | 2.1 | 0.31 | 3.75 | 70.3 | 63.8 | 216 | 383 |

EXAMPLE VI

Other adducts of the present invention were prepared as follows:

Adduct D

Propylene oxide (24 parts) was added dropwise and with stirring to Poly(aminoamide) I (408 parts) at 21°. When the addition had been completed, the mixture was heated to 150° over 1 hour and maintained at that temperature for a further 30 minutes. To the mixture so obtained, cooled to 25°, 2,4,6-tris(dimethylaminomethyl)-phenol (50 parts), glacial acetic acid (15 parts) and "Silicone DP 267" (1 part) were then added with stirring.

Adduct E

This was prepared as described for Adduct A, except that, in place of the butane-1,4-diol diglycidyl ether, n-butyl glycidyl ether (58 parts) was used.

Adduct F

This was prepared as described for Adduct A, except that, in place of the butane-1,4-diol diglycidyl ether, phenyl glycidyl ether (65.5 parts) was used.

To mixtures, each prepared by milling together rutile (70 parts), Epoxide resin I (87 parts) and iso-octyl glycidyl ether (13 parts), were added with stirring 60 parts of the indicated adduct and then 100 parts of water. The dispersions were spread into thin films, and allowed to dry at 21°. The touch-dry and hard-dry times (determined by the Beck-Koller method) were as follows:

| Adduct | Touch-dry | Hard-dry |
|---|---|---|
| D | 7 hours | 10 hours. |
| E | 7½ hours | 9½ hours. |
| F | 5½ hours | 9½ hours. |

EXAMPLE VII

Adduct G

The poly(aminoamide) employed, hereinafter called "Poly(aminoamide) III," was one prepared from an alkylenepolyamine and a copolymer of conjugated fatty acid esters with an aromatic vinyl compound; it had an amine value of 265–295, and was obtained from Messrs. J. Bibby and Sons Ltd. under the designation "Merginamide L 275."

Propylene oxide (80 parts) was added dropwise and with stirring to Poly(aminoamide) III (566 parts) at 21°. When the addition had been completed, the mixture was heated to 120° and kept at that temperature for 45 minutes. To the mixture so obtained, cooled to 25°, were added 2,4,6-tris(dimethylaminomethyl)phenol (50 parts), glacial acetic acid (15 parts) and "Silicone DP 267" (1 part).

This formulation (82 parts) was mixed with 87 parts of Epoxide resin I and 13 parts of iso-octyl glycidyl ether. On dilution with water, a stable aqueous dispersion was obtained, which formed hard, glossy, cured films on drying. The 2,4,6-tris(dimethylaminomethyl)phenol could be replaced by an equal weight of 2-(dimethylaminomethyl)-4-nonylphenol, with similar results. Likewise, the acetic acid could be replaced by 5 parts of orthophosphoric acid (85% aqueous solution) diluted with 20 parts of water. Incorporating 20 parts of 3-(glycidoxy)propyltrimethoxysilane improved the adhesion of the film in contact with water.

Adduct H

This was prepared as described for Adduct G except that the poly(aminoamide) used was a mixture of Poly(aminoamide) I (326 parts) and Poly(aminoamide) III (113 parts). Adduct H (67 parts) was mixed with 87 parts of Epoxide resin I and 13 parts of iso-octyl glycidyl ether; the product had the same favourable properties as Adduct G.

For purposes of comparison, a formulation was prepared from Poly(aminoamide) I without any adducting stage. The poly(aminoamide) (408 parts) was mixed with 2,4,6-tris(dimethylaminomethyl)-phenol (50 parts), glacial acetic acid (15 parts) and "Silicone DP 267" (1 part); 57 parts of this mixture were then added to 87 parts of Epoxide resin I and 13 parts of iso-octyl glycidyl ether. A useful dispersion could not be obtained on dilution with water, coarse particles rapidly settling out.

We claim:
1. A hardenable aqueous dispersion comprising
    (a) an 1,2-epoxide resin containing more than one terminal 1,2-epoxide group per average molecule,
    (b) as hardener therefor, an adduct, liquid at room temperature and containing hydrogen directly bonded to nitrogen, of (i) a member selected from the group consisting of aliphatic and araliphatic compounds containing only one terminal 1,2-epoxide group per molecule, and aliphatic compounds containing at least two terminal 1,2-epoxide groups per average molecule, with (ii) a stoichiometric excess of a poly(aminoamide) condensation product of (I) an alkylenepolyamine and (II) a polymeric araliphatic acid obtained by the copolymerisation of a member selected from the group consisting of a conjugated unsaturated fatty acid and an amide-forming derivative of a conjugated unsaturated fatty acid, with an aromatic vinyl compound.

2. A dispersion according to claim 1, wherein the compound (i) employed to form the adduct component (b) is a monoepoxy-alkane containing 2 to 4 carbon atoms.

3. A dispersion according to claim 2, wherein the monoepoxy-alkane is propylene oxide.

4. A dispersion according to claim 1, wherein the compound (i) is employed to form the adduct component (b) is a member selected from the group consisting of alkyl glycidyl ether containing a total of 5 to 11 carbon atoms and aryl glycidyl ether containing a total of 5 to 11 carbon atoms.

5. A dispersion according to claim 4 wherein the glycidyl ether is a member selected from the group consisting of n-butyl glycidyl ether and phenyl glycidyl ether.

6. A dispersion according to claim 1, wherein the aliphatic compound (i) employed to form the adduct component (b) is a diglycidyl ether of a dihydric alcohol containing from 2 to 6 carbon atoms.

7. A dispersion according to claim 6, wherein the diglycidyl ether is butane 1,4-diol diglycidyl ether.

8. A dispersion according to claim 1, wherein the polymeric araliphatic acid (II) is obtained by copolymerisation of a member selected from the group consisting of conjugated fatty acid, and lower alkyl ester thereof with styrene in a molar ratio between 1:0.2 and 1:5 in the substantial absence of free radical-forming catalysts and in the presence of an inhibitor for free radical-catalysed polymerisation.

9. A dispersion according to claim 8, wherein the poly(aminoamide) condensation product (ii) has an amine value of between 85 and 435.

10. A dispersion according to claim 1, wherein the poly(aminoamide) (ii) is used in a quantity sufficient to supply from about 5 to 20 amino-hydrogen atoms for each 1,2-epoxide group in the epoxide component (i).

11. A dispersion according to claim 1 wherein the component (b) is used in a quantity sufficient to provide from 0.75 to 1.25 amino-hydrogen equivalents per 1,2-epoxide equivalent of component (a)

12. A dispersion according to claim 1, wherein the 1,2-epoxide resin (a) is one obtained by the reaction of 2,2-bis(4-hydroxyphenyl) propane with epichlorohydrin and has an 1,2-epoxide content of about 2.0 to 5.88 epoxide equivalents per kilogram.

13. A dispersion according to claim 1, which also contains an accelerator for the hardening action.

14. A dispersion according to claim 13, wherein the accelerator is a Mannich base containing at least one tertiary amino nitrogen atom and one phenolic hydroxyl group.

15. A dispersion according to claim 14, wherein the Mannich base is a member selected from the group consisting of 2,4,6-tris(dimethylaminomethyl)phenol and 2-dimethylamino-methyl-4-nonylphenol.

16. A dispersion according to claim 1, which also contains as a reactive diluent a glycidyl ether of an aliphatic monohydric alcohol having from 4 to 10 carbon atmos.

17. A dispersion according to claim 1, which also contains as a reactive diluent a diglycidyl ether of an aliphatic dihydric alcohol having from 2 to 6 carbon atoms.

18. A dispersion according to claim 1, which also contains as an adhesion promoter, 3-(glycidoxy) propyltrimethoxysilane.

19. A dispersion according to claim 1, which also contains an acid selected from the group consisting of orthophosphoric acid and a liquid monocarboxylic fatty acid.

(References on following page)

References Cited

UNITED STATES PATENTS

| | | | |
|---|---|---|---|
| 3,396,141 | 8/1968 | Weller | 260—18 X |
| 3,396,140 | 8/1968 | Weller | 260—18 X |
| 3,316,195 | 4/1967 | Grosner et al. | 260—29.2 X |
| 3,316,187 | 4/1967 | Grosner et al. | 260—29.2 |
| 3,310,511 | 3/1967 | Reinert | 260—29.2 |
| 3,282,872 | 11/1966 | Baltes et al. | 260—18 |
| 3,240,736 | 3/1966 | Beckwith | 260—29.2 |
| 3,130,069 | 4/1964 | Battles et al. | 260—830 |
| 3,019,076 | 1/1962 | Pardo et al. | 260—18 X |
| 2,970,971 | 2/1961 | Katz et al. | 260—830 X |
| 2,901,461 | 8/1959 | Auerbach et al. | 260—47 |
| 2,899,397 | 8/1959 | Aelony | 260—18 |
| 2,864,775 | 12/1958 | Newey | 260—47 X |

FOREIGN PATENTS

| | | |
|---|---|---|
| 767,703 | 9/1967 | Canada. |
| 566,130 | 11/1958 | Canada. |
| 630,369 | 3/1963 | Belgium. |

DONALD E. CZAJA, *Primary Examiner.*

C. W. IVY, *Assistant Examiner.*

U.S. Cl. X.R.

106—90; 260—18, 29.2, 29.6, 37, 830.